United States Patent Office 3,390,098
Patented June 25, 1968

3,390,098
ANTIOXIDANT COMPOSITION
La Verne Willard Van Ness, Bradley, Ill., assignor to Armour Pharmaceutical Company, Chicago, Ill., a corporation of Delaware
No Drawing. Filed June 8, 1964, Ser. No. 373,571
15 Claims. (Cl. 252—404)

ABSTRACT OF THE DISCLOSURE

An antioxidant composition containing two or more antioxidant solutes and a solvent containing a polyoxyalkylene ether, and methods of using the composition to protect food products from oxidation.

This invention relates to compositions of matter which are useful as antioxidants in the manufacture and processing of innumerable food items, including fats and oils. More particularly, this invention relates to such compositions which comprise a plurality of antioxidant solutes and a solvent containing polyoxyalkylene ether, and to methods of preparing and using the same.

A severe limitation in the art of formulating antioxidant compositions has heretofore existed and arises from the antagonism between certain otherwise acceptable antioxidant solutes. For example, it has heretofore been impossible to formulate antioxidant compositions to exploit the beneficial properties of such solutes when this antagonism exists. This antagonism is usually manifested by the inability to maintain all of the antagonistic solutes in solution with each other.

A classic example of antagonism between otherwise beneficial solutes is that which exists between butylated hydroxytoluene, herein referred to as ("BHT"), and nordihydroguairetic acid herein referred to as ("NDGA"). Another example of such antagonism is that which exists between BHT and propyl gallate (see: U.S. Patent No. 2,843,497).

The problem is further magnified because BHT is substantially completely insoluble in propylene glycol, the generally accepted antioxidant solvent.

A further problem of the prior art arises from the need to have butylated hydroxyanisole (BHA) present to solubilize antioxidant formulations to be used in frying media because BHA releases an unpleasant odor when used in such media.

The present invention is predicated upon my discovery that a solvent containing polyoxyalkylene ether will overcome the antagonism between and permit the use of a plurality of antagonistic antioxidant solutes in a single composition including the formulation of antioxidants for use with frying fats which do not require BHA. My invention is based also on my further discovery that antioxidant compositions prepared with my solvents possess highly useful and completely unexpected properties.

Accordingly, a prime object of the present invention is to provide stable, homogeneous antioxidant compositions for exploiting the beneficial properties of two or more known incompatible and antagonistic antioxidant solutes.

Another object of the present invention is to provide an antioxidant composition in which BHT can compatibly coexist with antioxidant solutes such as NDGA and propyl gallate heretofore believed to be incompatible with BHT.

Still another object of the present invention is to provide an improved antioxidant concentrate which is both oil soluble and water miscible and can be used in water as well as in fats and oils.

A further object of the present invention is to provide an antioxidant composition which is especially useful in fats and oils for frying and when so used does not release objectionable odors.

Another object of the present invention is to provide an antioxidant composition which obtains unique compatibility between materials heretofore deemed incompatible, which contains solute concentrations heretofore considered impossible and which is capable of being sprayed on food product or packages for food product without clogging spray nozzles.

These and still further objects, as shall hereinafter appear, are fulfilled by the present invention in a remarkably unexpected fashion as may be readily discerned from the following detailed description of certain exemplary embodiments of my invention.

In general, I practice my invention by first placing my solvent system into a steam heated glass lined tank preferably equipped with a mechanical agitator. The agitator is started and sufficient steam is applied to the tank to raise and maintain the inside temperature of the tank at about 250° F. To this tank containing the solvent, and prior to the addition of the solute, I may add a small but effective amount of a suitable chelating agent, such for example as citric acid, phosphoric acid, ethylene diamine tetraacetates (EDTA) or the like, which functions to hold trace metallic ions which might otherwise catalyze oxidation. When the chelating agent is in solution, the tank is cooled to about 200 to 210° F. as by the application of cooling water on the jacket of the tank.

At this point I add my solutes, either jointly or separately. Preferably, I add a first solute, for example, BHT, while the agitator is running. When this addition is completed, the inside tank temperature is adjusted to and maintained at about 190–200° F. The agitation is continued until the added solute is substantially completely dissolved in the solvent as evidenced by the contents becoming clear. While the agitator is still running, the second solute for example, NDGA, is added. The temperature of the tank contents is still maintained at about 190–200° F. Again, I continue to run the agitator until a clear solution is obtained. If desired, this solution can be now packaged or, when appropriate, I can add a third solute, for example, propyl gallate. I will adjust the temperature, and maintain the agitation as before until a clear solution is obtained. Subsequent solute additions will be accomplished in the same manner.

After all of the desired solutes have been introduced in the manner described, the final solution is withdrawn from the tank, preferably, while still warm, that is, at a temperature between 100 and 110° F., and put in suitable containers. The preference for warmth is because the formulation flows more easily when slightly warm.

In addition to the problem solutes specifically referred to above, viz., BHT, NDGA and propyl gallate, I find that my solvent results in antioxidant compositions having unexpectedly superior properties even when one of my plurality of antioxidant solutes is for butylated hydroxyanisole (BHA) or 2,4,5-trihydroxy butyrophenone (THBP), or mixed tocopherols. It is therefore my intention that the term "antioxidant solutes" as used herein shall include BHT, NDGA, propyl gallate, BHA, THBP, and tocopherols. Tocopherol, as used herein, includes so called alpha, beta and gamma tocopherol whose structures are known to the art. The common names for these tocopherols are, respectively, 3,8 dimethyl tocol, 5,8 dimethyl tocol, and 7,8 dimethyl tocol. The full name, using $\beta$-tocopherol as illustrative, is 2,5,8-trimethyl-2-(4′,8′,12′-trimethyl tridecyl)-6-chromanol.

An important ingredient of my improved composition is my solvent which, as indicated, contains polyoxyalkylene ethers and which shall now be described.

An especially useful polyoxyalkylene ether for the practice of this invention is polyoxyethylene sorbitan monooleate, a complex mixture of polyoxyethylene ethers of mixed partial oleic esters of sorbital anhydrides (known as "polysorbates"). I have found, as shall hereafter appear, that especially fine results are obtained when these polyoxyalkylene ethers are used in combination with propylene glycol ester of soyabean oil and, in certain instances, with propylene glycol.

Other polyoxyalkylene ethers for use with this invention are the water soluble polyoxyalkylene derivatives of hexitol anhydride partial long chain fatty acid esters such, for example, as the polyoxyalkylene derivatives of sorbitan monolaurate, sorbitan monopalmitate, sorbitan monostearate and sorbitan monooleate which are commercially available as Tween 20, Tween 40, Tween 60 and Tween 80, respectively.

I have also found that an effective amount of polyoxyalkylene ether substantially obviates the tendency of propylene glycol to induce precipitation of incompatible solutes.

This is an advantageous discovery because a portion of my solvent can comprise propylene glycol which when desired reduces the cost of the solvent without greatly impairing the benefits which I have found to result from the polyoxyalkylene ethers.

In the practice of this invention, it is desirable to blend into my solvent a small but effective amount of a chelating agent, such, for example, as citric acid, phosphoric acid, ethylene diamine tetra-acetates (EDTA) or the like, which hold trace metallic ions which might otherwise catalyze oxidation.

As shall appear below, these compositions comprising two or more antioxidant solutes in my solvent, with or without the chelating agent, obtain a unique combination of properties, many of which are totally unexpected.

For instance, the antioxidant compositions formulated into a solvent comprising polyoxyalkylene ether and particularly the polyoxyalkylene ester of sorbitan monooleate, either alone, or with propylene glycol esters of soyabean oil, are completely homogeneous and exhibit vastly improved shelf life even when the formulations contain such incongruous antioxidant solute combinations as BHT and NDGA; BHT and propyl gallate; BHT, NDGA and BHA; BHT, propyl gallate and BHA; as well as other solute combinations comprising at least two solutes selected from the group consisting of propyl gallate, BHT, NDGA, BHA, THBP, and the tocopherols.

Further, these compositions may be readily applied in a water carrier and do not require application in fat or oil heretofore considered essential to the art, although if it is desired, these later vehicles may be also employed in the application of my formulations. This permits me to readily spray both product, such for example, roasted grains, as well as the liners of the packages in which they are packed, for example, cereal boxes, without clogging my spray equipment. Thus my formulations also provide a real benefit to the cereal industry.

Further, the compositions of this invention obtain antioxidant activity which is superior to anything heretofore obtainable using the solvents of the prior art as shall be shown in the data reported below.

I also have found a vast improvement both in shelf life of my antioxidant concentrate, thereby enabling the user to have confidence in his mixing ratios, and in the shelf life of product with which the concentrate is used. To further aid in the understanding of the invention, and not by way of limitation, attention is directed to the following examples.

EXAMPLE I 2400 lbs. of solvent is placed into a 1000 gallon glass lined tank equipped with an agitator serviced with steam and cooling water. The agitator is then started and steam is put on the jacket to heat the charge to 245–250° F.

With the agitator running, 480 lbs. of chelating agent is added to the charge while maintaining the batch temperature at 245–250° F. When the chelating agent is all in solution, I and add 1600 lbs. of the first antioxidant and allow the temperature to drop to 190–200° F. When this antioxidant is added completely, the batch temperature is adjusted to 190–200° F. by heating or cooling the batch, whatever is needed.

With the agitator running, I then add 3200 lbs. of a second antioxidant. When this addition is complete, I adjust the batch temperature to 190–200° F. and continue agitating the batch until a substantially clear solution results. At this point I may draw my product for packaging or, for batches in which a third antioxidant solute is desired, I may introduce the third solute at this time while the agitator is still running. Again, the batch temperature must be adjusted to 190–200° F. The agitation is continued until the batch becomes a clear solution. At this point, then, the antioxidant composition may be withdrawn from the tank and packaged. Preferably, packaging is accomplished while the solution is still warm, that is, at a temperature of about 100–110° F.

EXAMPLE II

Using the procedure of Example I, an antioxidant formulation was prepared having the following composition (percent by weight):

| | Percent |
|---|---|
| Butylated hydroxyanisole | 40 |
| Nordihydroguairetic acid | 4 |
| Citric acid | 6 |
| Polyoxyalkylene ethers | 50 |

The formulation was oil soluble, water miscible, has excellent antioxidant properties and remained homogeneous on the shelf during a shelf-life test extending in excess of two weeks at room temperature.

EXAMPLE III

Using the procedure of Example I, an oil soluble and water miscible antioxidant formulation was prepared having the following composition:

| | Percent |
|---|---|
| Butylated hydroxyanisole | 13.3 |
| Butylated hydroxytoluene | 13.3 |
| Citric acid | 5.0 |
| Polyoxyalkylene ethers | 9.5 |

This composition exhibited very fine antioxidant properties and an extended shelf life.

EXAMPLE IV

Using the procedure of Example I, an oil soluble and water miscible antioxidant formulation was prepared having the following composition:

| | Percent |
|---|---|
| Butylated hydroxyanisole | 28.0 |
| Propyl gallate | 12.0 |
| Chelating agent | 6.0 |
| Polyoxyalkylene ethers | 54 |

This formulation also had fine antioxidant properties and exhibited an extended shelf life.

EXAMPLE V

The formulation prepared according to Example III was mixed into 5 hour prime lard at weight ratios of 1:1330, 1:2660, and 1:4000 (parts of formulation to parts of lard by weight). The lard was then tested in accordance with the standard active oxygen method (AOM) to determining oxidation resistance, i.e., time to rancidity. The results of this test are reported in Table I, below.

TABLE I

| Ratio: | A.O.M. Hours |
|---|---|
| 1:1330 | 78 |
| 1:2660 | 54 |
| 1:4000 | 37 |

EXAMPLE VI

A formulation was prepared according to Example I and contained (in weight percent): 25 percent BHA; 25 percent propyl gallate; 3 percent citric acid, and 47 percent polysorbate 80. This formulation was mixed into 5 hour prime lard in ratio of 1 part antioxidant to 2500 parts of lard and 1 part antioxidant to 4000 parts of lard and subjected to tests by the active oxygen method. The results are reported in Table II, below:

TABLE II

| Ratio: | A.O.M. Hours |
|---|---|
| 1:2500 | 96 |
| 1:4000 | 72 |

EXAMPLE VII

Using the procedure of Example I, an antioxidant formulation was prepared containing (in weight percent):

| | Percent |
|---|---|
| BHA | 13.3 |
| BHT | 13.3 |
| Citric acid | 5 |
| Polysorbate | 48.4 |
| Propylene glycol ester of soyabean oil | 20 |

This formulation was added to a 5 hour prime steam lard at a ratio of 1 part antioxidant to 1330 parts lard and 1 part antioxidant to 2660 parts lard and the stability was measured by the active oxidation method. These results were obtained:

| Ratio: | A.O.M. Hours |
|---|---|
| 1:1330 | 64 |
| 1:2660 | 48 |

The formulation was completely uniform and stable and, when subjected to a descending temperature test, was found to remain stable at temperatures below 32° F.

EXAMPLE VIII

Using the procedure of Example I, additional formulations were prepared, identified as Specimen A through V inclusive in Table III. Without exception, all specimens were uniform and each exhibited a shelf life which equaled or excelled similar formulations previously available.

EXAMPLE IX

An oil soluble and water miscible antioxidant formulation was prepared having the following composition (in weight percent):

| | |
|---|---|
| BHT | 10 |
| Propyl gallate | 10 |
| NDGA | 6 |
| Citric acid | 4 |
| Polysorbate | 70 |

The citric acid and polysorbate were admixed while heating to about 125° C., the mixture was then cooled to and maintained at about 100° C. and the BHT, propyl gallate and NDGA were added with stirring. A clear uniform solution resulted which after two weeks was still clear and uniform. There was no evidence of any separation or precipitation.

EXAMPLE X

An antioxidant formulation was prepared by warming polysorbate to about 100° to which BHT was added with stirring. The mixture was then heated to about 125° C. and propyl gallate was added with stirring. A clear solution resulted which maintained its stability for over two weeks. The composition (weight percent) of the formulation was:

| | |
|---|---|
| Propyl gallate | 10 |
| BHT | 10 |
| Polysorbate | 80 |

EXAMPLE XI

Several formulations were prepared in accordance with the procedure of Example I in which the amounts of polysorbate 80 and propylene glycol esters of soybean oil ("PGSB") were varied to determine optimum homogeneity of a composition containing (in weight percent) 15 percent BHT, 6 percent NDGA, 4 percent citric acid, and 75 percent solvent. The results of these tests are reported in Table IV. The code, used in rating the compositions for homogeneity, is:

E=excellent, completely clear and uniform solution
F=fine, no separation, slight turbidity
G=good, no separation, two solution phases
U=unsatisfactory, precipitation occurred TABLE IV.—EVALUATION OF HOMOGENEITY OF COMPOSITIONS EMPLOYING SOLVENT SYSTEM CONTAINING IN WEIGHT PERCENT

| Polysorbate 80 | 75 | 60 | 55 | 50 | 45 | 40 | 35 | 35 | 30 | 25 | 20 | 15 | 10 |
|---|---|---|---|---|---|---|---|---|---|---|---|---|---|
| PGSB | 0 | 15 | 20 | 25 | 30 | 35 | 40 | 40 | 45 | 50 | 55 | 60 | 65 |
| Rating | F | E | E | E | E | E | E | E | G | G | G | G | G |

TABLE III.—SPECIMEN COMPOSITION (WT. PERCENT)

| Constituent | A | B | C | D | E | F | G | H | I | J | K | L | M | N | O | P | Q | R | S | T | U | V |
|---|---|---|---|---|---|---|---|---|---|---|---|---|---|---|---|---|---|---|---|---|---|---|
| BHA | | 40 | | 40 | 10 | 10 | 20 | 20 | 28 | 28 | 40 | 40 | 13.3 | 13.3 | 20 | 20 | 10 | 10 | 28 | 28 | 20 | |
| BHT | | 20 | | 20 | | 10 | 10 | | | | | | 13.3 | 13.3 | | 10 | 10 | | | | | 20 |
| NDGA | | 6 | 4 | | | | | 4 | | | 4 | 4 | | | | | | | | | | |
| Propyl Gallate | | | 6 | | 6 | 6 | 6 | 6 | 12 | 12 | | | | | 6 | 6 | 6 | 6 | 12 | 12 | 6 | 6 |
| Polyoxy-Alkylene Ether | 70 | 54 | 70 | 52 | 64 | 68 | 64 | 35 | 50 | 54 | 30 | 30 | 46.4 | 48.4 | 35 | 70 | 51 | 35 | 39 | 70 | 64 |
| Propylene Glycol Ester of Soyabean oil | | | | | | | | | | | 15 | 20 | 17 | 20 | | | 17 | 13 | 15 | 15 | | |
| Propylene Glycol | | | | | | | 35 | | | | | | | 29 | | | | | | | | 10 |
| Chelating Agent e.g., Citric Acid | 4 | 2 | 4 | 4 | 10 | 6 | 10 | 4 | 10 | 6 | 10 | 6 | 10 | 5 | 10 | 4 | 6 | 10 | 10 | 6 | 4 | 10 |

EXAMPLE XII

Additional formulations were prepared in the manner of Example XI to examine the effect of varying the content of polysorbate and PGSB in the solvent in a composition containing (in weight percent): 20 percent BHT, 6 percent NDGA, 4 percent citric and 70 percent solvent. (It will be noticed that both this formulation and that of the Example XI have heretofore been considered impossible to form in a compatible solution, regardless of the solvent system employed. The results of this effort are reported and evaluated (using the Code described in Example XI) in Table V below.

TABLE V.—EVALUATION OF HOMOGENEITY OF COMPOSITIONS EMPLOYING SOLVENT SYSTEM CONTAINING IN WEIGHT PERCENT

| Polysorbate 80 | 60 | 55 | 50 | 45 | 40 | 35 | 30 | 25 | 20 | 15 | 10 |
|---|---|---|---|---|---|---|---|---|---|---|---|
| PGSB | 10 | 15 | 20 | 25 | 30 | 20 | 40 | 45 | 50 | 55 | 60 |
| Rating | U | U | U | U | U | U | U | G | G | G | G |

As above indicated, 20 percent BHT generally, overtaxed the system but at that, polysorbate 80 to PGSB in ratios between 5:9 and 1:6 succeeded in bringing 20 percent BHT into solution in the presence of 6 percent NDGA.

From the foregoing it is apparent that new and useful antioxidant compositions have been herein described and illustrated which fulfill all of the aforestated objections in a remarkably unexpected manner. It is of course understood that such modifications and alterations as may readily occur to the artisan confronted with this disclosure are intended within the spirit of this invention, especially as it is defined by the scope of the claims appended hereto.

What is claimed is:

1. An antioxidant composition containing at least two antioxidant solutes dissolved in a polyoxyalkylene ether derived from a hexahydric alcohol, said antioxidant solutes being selected from the group consisting of butylated hydroxytoluene, nordihydroguaiaretic acid, propyl gallate, butylated hydroxyanisole, 2,4,5-trihydroxybutyprophenone, and tocopherols.

2. An antioxidant composition according to claim 1 containing a chelating agent.

3. A composition according to claim 2 in which said chelating agent is selected from the group consisting of citric acid, phosphoric acid, and ethylene diamine tetraacetates.

4. An antioxidant composition according to claim 3 comprising up to about 50% of at least two antioxidant solutes, up to about 10% citric acid, and the remainder a solvent containing polyoxyalkylene ether.

5. An antioxidant composition according to claim 4 in which one of said solutes is butylated hydroxytoluene.

6. An antioxidant composition comprising from about 26 to 50 weight percent of at least two antioxidant solutes selected from the group consisting of butylated hydroxyanisole, butylated hydroxytoluene, nordihydroguaiaretic acid, and propyl gallate, from 2 to about 10 percent citric acid, and the remainder a solvent containing polyoxyalkylene ether.

7. A composition according to claim 6 in which said polyoxyalkylene ether is selected from the group consisting of the polyoxyalkylene derivatives of sorbitan monolaurate, sorbitan monopalmitate, sorbitan monostearate, sorbitan monooleate and mixtures thereof.

8. A composition according to claim 7 containing from 0 to about 40 weight percent of butylated hydroxyanisole, from 0 to about 20 weight percent butylated hydroxytoluene, from 0 to about 25 weight percent propyl gallate, and from 0 to about 6 weight percent nordihydroguaiaretic acid.

9. An antioxidant composition comprising from about 26 to about 50 weight percent of at least two antioxidant solutes selected from the group consisting of butylated hydroxytoluene, butylated hydroxyanisole, nordihydroguaiaretic acid, and propyl gallate, from about 2 to about 10 weight percent citric acid, and the remainder a solvent consisting of polyoxyalkylene ether and propylene glycol ester of soyabean oil.

10. A composition according to claim 9 containing less than about 20 weight percent BHT and up to about 6 weight per cent NDGA.

11. A composition according to claim 10 containing from about 10 to about 75 weight percent of polysorbate 80.

12. A composition according to claim 10 containing from about nil to about 65 percent propylene glycol ester of soyabean oil.

13. A composition according to claim 12 consisting of up to about 20 percent (by weight BHT, 6 percent NDGA and a solvent containing polysorbate 80 and propylene glycol ester of soyabean oil in the ratio of from 5:9 to 1:6 polysorbate to propylene glycol.

14. An antioxidant composition consisting of (by weight percent) 40 percent BHA, 4 percent NDGA, 2 percent citric acid, and 54 percent polysorbate 80.

15. A stable homogeneous antioxidant composition containing a plurality of antioxidant solutes heretofore considered incompatible in propylene glycol and a solvent containing propylene glycol and polyoxyalkylene ether.

References Cited

UNITED STATES PATENTS

| | | | |
|---|---|---|---|
| 2,535,910 | 12/1950 | Fonyo | 99—163 |
| 2,843,497 | 7/1958 | Stuckey et al. | 99—163 X |
| 2,933,399 | 4/1960 | Nickerson et al. | 99—150 X |
| 3,052,562 | 9/1962 | Ferrante | 252—404 X |

OTHER REFERENCES

"Tenox-Eastman Food-Grade Antioxidants," published by Eastman Kodak Co., 1963, p. 13, copy in Gr. 160.

"Atlas Surface Active Agents," published by Atlas Powder Co., Wilmington, Del., 1948, page 4, copy in group 170.

MAURICE W. GREENSTEIN, *Primary Examiner.*